United States Patent [19]

Lapeyre et al.

[11] 4,213,527
[45] * Jul. 22, 1980

[54] CHAIN LINK CONVEYORS

[75] Inventors: James M. Lapeyre; Fernand S. Lapeyre, both of New Orleans, La.

[73] Assignee: The Laitram Corporation, New Orleans, La.

[ * ] Notice: The portion of the term of this patent subsequent to Mar. 11, 1992, has been disclaimed.

[21] Appl. No.: 759,721

[22] Filed: Jan. 17, 1977

Related U.S. Application Data

[60] Continuation-in-part of Ser. No. 477,692, Jun. 10, 1974, abandoned, which is a division of Ser. No. 187,746, Oct. 8, 1971, Pat. No. 3,870,141, which is a continuation-in-part of Ser. No. 63,523, Aug. 13, 1970, abandoned.

[51] Int. Cl.² .............................................. B29F 3/01
[52] U.S. Cl. ..................................... 198/853; 29/453; 264/145; 264/150; 264/156
[58] Field of Search ............... 264/145, 148, 150, 157, 264/159, 156; 198/851, 853; 74/243 C, 245 R, 245 C, 250 C

[56] References Cited

U.S. PATENT DOCUMENTS

| | | | |
|---|---|---|---|
| 2,737,755 | 3/1956 | Schigas | 59/DIG. 1 |
| 3,050,842 | 8/1962 | Evans | 264/159 X |
| 3,086,246 | 4/1963 | Stone | 264/145 X |
| 3,590,108 | 6/1971 | Startin | 264/150 |
| 3,724,285 | 4/1973 | Lapeyre | 198/853 X |
| 3,770,862 | 11/1973 | Rojahn | 264/148 |
| 3,870,141 | 3/1975 | Lapeyre et al. | 198/853 |
| 3,924,738 | 12/1975 | Poupitch | 264/159 X |
| 3,942,237 | 3/1976 | Ongaro | 264/148 X |
| 4,080,842 | 3/1978 | Lapeyre et al. | 198/853 X |

FOREIGN PATENT DOCUMENTS

| | | | |
|---|---|---|---|
| 1428362 | 1/1966 | France | 264/150 |
| 944137 | 12/1963 | United Kingdom | 198/853 |

*Primary Examiner*—Thomas P. Pavelko
*Attorney, Agent, or Firm*—Schiller & Pandiscio

[57] ABSTRACT

A chain link conveyor comprises modules made of an organic plastic material and pivotably connected to one another. Each module is designed to be extruded as a slab and machined to form a module comprising intermediate sections, reinforcing center sections and a number of parallel spaced link end sections having aligned holes for receiving pivot rods. The module also includes a specially designed rib adapted to interact with suitable drive means of a conveyor system.

28 Claims, 17 Drawing Figures

CHAIN LINK CONVEYORS

RELATED APPLICATIONS

This application is a continuation-in-part application of U.S. application Ser. No. 477,692 filed June 10, 1974, now abandoned; which in turn is a divisional application of U.S. application Ser. No. 187,746, now U.S. Pat. No. 3,870,141 issued Mar. 11, 1975, which in turn is a continuation-in-part of U.S. Ser. No. 63,523 filed Aug. 13, 1970, now abandoned.

This invention relates to conveying systems and more particularly to a novel chain link conveyor system comprising improved modules and the process of making such modules.

The type of chain link conveyor, to which the present invention is directed, typically comprises an endless chain of links each pivotally connected at its ends to adjacent links. In the simplest form of conveyor construction, each link is formed with openings at opposite ends through which pivot pins can be used to join the two links together. A conveyor of a particular length and width is obtained by assembling a large number of individual links on each pin with alternate links being mounted at opposite ends. The fabrication, handling and assembly of a large number of individual links to provide an endless conveyor can be a time consuming and costly process unless automatic manufacturing tools and assembly machinery are employed; such tools and machinery usually represent a substantial expense.

In our copending parent application, U.S. Ser. No. 477,692 filed June 10, 1974, in earlier application U.S. Ser. No. 187,746 filed Oct. 8, 1975, now U.S. Pat. No. 3,870,141 issued Mar. 11, 1975; and in earlier application U.S. Ser. No. 63,523 filed Aug. 13, 1970, now abandoned, (all three applications being hereinafter referred to as our "previous applications") we describe a conveyor module comprising a multiplicity of preassembled link-like elements arranged so that the module is end-to-end mateable and reversible, i.e., a module will be able to be connected to or mate with a like module at their ends with a pivot rod regardless of which end of which module is employed. The multiplicity of link-like elements of each module are formed together as a unit with integral cross members forming a rigid grid structure adapted to resist lateral and bending stresses. Each module, as well as each pivot pin, can be formed of an organic polymeric material in order to provide a rugged and dependable conveyor which (1) will support materials without marring or scratching those materials, (2) is relatively easy to assemble and disassemble and repair, (3) can operate in a highly corrosive environment (such as one with salt water present), and (4) can be employed to convey foodstuffs during processing, because it is easy to clean and the need is eliminated to use lubricants that might contaminate the material being conveyed.

As disclosed in our previous applications these modules are designed to be formed as an integral unit by a conventional molding process such as injection molding. Accordingly, modules of various shapes and sizes can be custom made depending upon the particular use to which the modules (and more particularly the assembly conveyor system using the modules) are to be put.

Molding these modules however is relatively expensive, particularly for small production runs since a mold must be made for each size and each shape of module to be produced. As described with respect to one module disclosed in our previous applications, a continuous production technique for manufacturing the module, with any desired number of link ends, can be accomplished by continuously extruding molten plastic through a die having the shape of the cross-section of the module taken along a plane extending perpendicular to the axes of the pin-receiving holes provided at each link end of the module, and cooling the extruded slab to form a substantially rigid structure. The spaces between link-ends can then be provided by machining such as punching or cutting in from opposite edges of the extruded slab.

Objects of the present invention therefore are to provide a novel and improved relatively inexpensive conveyor module, whose shape and size can be varied without appreciably affecting the costs of making the modules; to provide an improved conveyor module as described in the form of an integral unit adapted to production by conventional extrusion processes; to provide a conveyor module formed of organic plastic material that is simple and inexpensive to manufacture and assemble to form a novel conveyor belt, mat or the like; to provide a novel chain link conveyor system and, to provide a novel method of making such modules and conveyor belt.

Since the structure of chain link conveyor belts composed of individual links tends to place severe lateral and bending stresses on the pivot rods resulting in lateral separation of the links and bending or deformation of the conveyor links or pins from a planar or linear configuration, another object of the invention is to provide an integrally-formed extruded conveyor module comprising improved means for engaging suitable drive means of a conveyor drive system and a multiplicity of link-like elements formed together as a unit with at least one integral cross member forming a rigid grid structure, so that the module is adapted to resist lateral and bending stresses. Yet another object of the present invention is to provide an improved conveyor belt and drive system.

Other objects of the invention will, in part, be obvious and will, in part, appear hereinafter.

The invention accordingly comprises the processes involving the several steps and the relation and order of one or more of such steps with respect to the others and the products possessing the featured properties, construction, combination of elements and arrangement of parts, which are exemplified in the following detailed disclosure, and the scope of the application of which will be indicated in the claims.

For a fuller understanding of the nature and objects of the invention, reference should be made to the following detailed description taken in connection with the accompanying drawings wherein.

Figure 1:
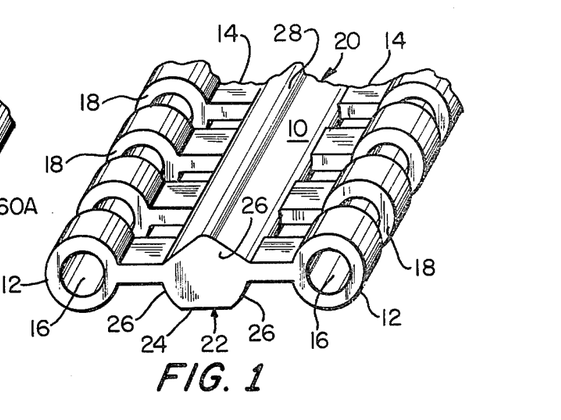
FIG. 1 is a perspective fragmentary view of one embodiment of a module incorporating the principles of the present invention.

Reference is now made to FIG. 1 of the drawings wherein there is illustrated one embodiment of the chain link conveyor module embodying the principles of the present invention. These modules generally designated 10, are designed in accordance with the present invention to be formed as an integral unit by an extrusion process and further modified in accordance with the present invention. The module shown in FIG. 1 is similar to the modules described in our previous applications in that it comprises a multiplicity of elongated, parallel, spaced apart link-like elements, for example, twenty-four or one hundred twenty. Thus, in the form shown, the length dimension of the module is equal to the length of each link and the width is determined by the number of links.

All of the link-like elements are substantially identical and each includes opposite end portions 12, each end portion joined by an intermediate, web or connecting portion 14. In the embodiment shown each end portion 12 is cylindrically shaped and formed so as to circumscribe a corresponding one of aligned holes 16 for receiving pivot pins or rods adapted to pivotally connect the modules end to end while laterally aligning adjacent modules. Intermediate or connecting portion 14 preferably comprises a plurality of links, each joined to a corresponding link end or portion 12 and having a generally rectangular cross section. Each portion 12 is preferably dimensioned with a greater cross-sectional depth than cross-sectional width for greater structural integrity to resist bending stresses. End portions 12 are preferably deeper than connecting portions 14 and are formed with parallel planar facing surfaces 18 each spaced from adjacent surfaces by just slightly greater (e.g. 0.01 cms) than the thickness (width) of the end portions so that the end portions of the link elements of each module fit snugly but movably between the end portions of every other module with the parallel facing surfaces 18 in contact with one another. The link-like elements are joined as a unit by at least one spaced cross-member or center portion 20 formed integrally with connecting portions 14 to form a rigid open grid-like structure. Cross-member 20 functions to maintain the link-like elements in parallel relation so that surfaces 18 of end portions 12 are kept parallel and pivot holes 16 are aligned, thereby minimizing bending stresses across pivot rods 29 extending through holes 16, the rods being described in greater detail hereinafter.

In accordance with the present invention the bottom side of the cross member 20 is provided with a continuous elongated rib 22 having a substantially flat bottom surface 24 and side surface 26. Preferably, side surface 26 are formed as cylindrical surfaces having a common axis of rotation, the axis extending parallel to the elongated direction of the rib. The deep, relatively thick cross-sectional configuration of center portion 20 including rib 22 of the module provides a strong, rigid structure. Rib 22 formed by surfaces 24 and 26 is shaped so as to form a tooth so that a plurality of modules joined as a belt can be driven by engagable drive gears having grooves adapted to mate with the ribs of the modules, all as described hereinafter. In the embodiment shown in FIG. 1, the portion of cross-member 20, opposite rib 22 is provided with a projection or ridge 26. The latter is formed with a triangular cross-section having its apical edge 28 preferably lying in a plane which is tangential to the upper peripheral surfaces of the link ends 12.

Figure 2:
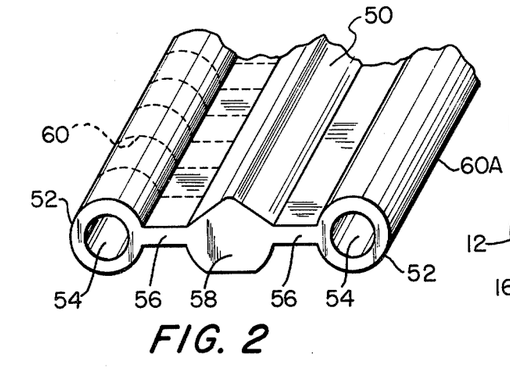
FIG. 2 is a perspective, fragmentary view, of an intermediate form of the embodiment of FIG. 1 made in accordance with the method of the present invention.

In accordance with the method of the present invention, module 10, is first formed as the intermediate product 50 shown in FIG. 2 by extruding molten plastic through an extrusion die having a cross-sectional shape of module 10 taken along a plane extending perpendicular to the axis of holes 16. The plastic is extruded through the die and cooled to form a substantially rigid structure or slab having opposite end portions 52 preferably formed with cylindrical pivotal holes 54. It will be appreciated however, that alternatively the end portions 52 can be extruded as solid cylindrical sections and that pivotal holes 54 can subsequently be formed therein. End portions 52 are integrally attached with web sections 56 which in turn are integrally connected to center portion 58.

Intermediate product 50 shown in FIG. 2 is then gang machined or cut in from opposite edges 60 and 60A of extruded slab 50, either one side at a time as shown in dotted lines or simultaneously, so as to form module 10.

Figure 3:
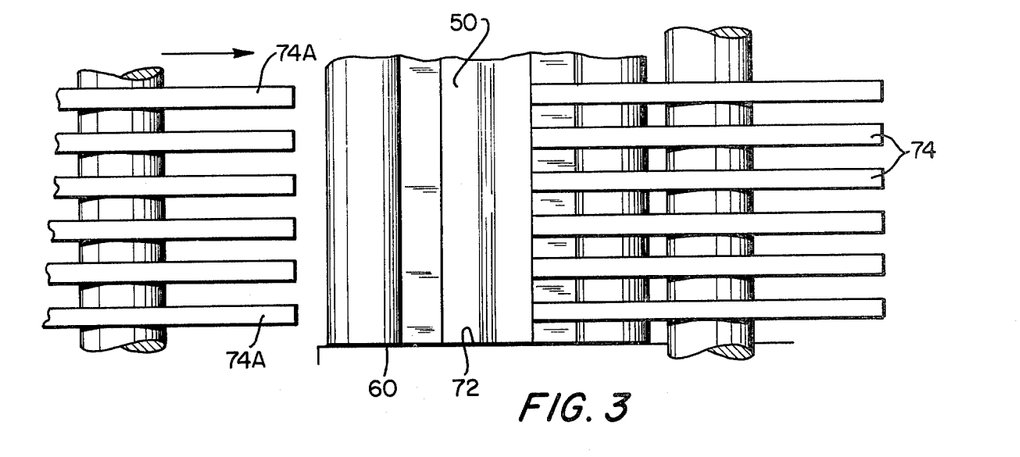
FIGS. 3 and 4 are plan and elevational views, respectively showing apparatus for carrying out the method of the present invention.
Figure 4:
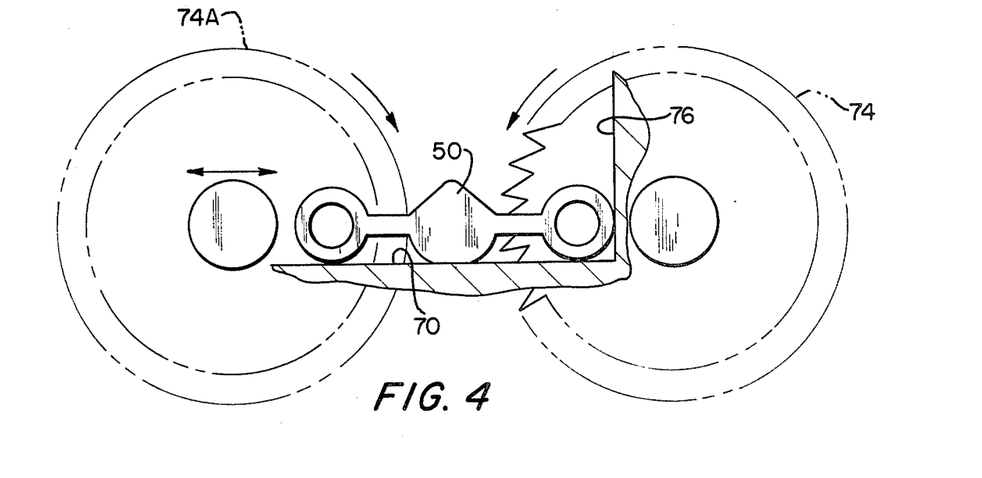

More specifically, referring to FIGS. 3 and 4 intermediate form 50 of module 10 is placed upon a cutting surface 70 and one end 60 of slab 50 is positioned against stop 72. Incisions are then made in a direction perpendicular to the axis of holes 54 so as to form the link-like elements 12 of FIG. 1. Preferably, the incisions are made by moving either one of the edges 60 or 60A of slab 50 relative to a plurality of ganged cutters or blades 74 and then moving a second plurality of rotating ganged cutters 74A relative to the opposite edge 60 or 60A of the intermediate slab 50. The cutters 74 and 74A can be used to cut slab 50 to form only the end sections leaving the intermediate or web portion 56 solid, or, in the alternative, they can also cut into the intermediate portion to form the intermediate or connecting sections 14 as shown in FIG. 1. The extent of the cut is determined by the design of the particular module, as will be more evident hereinafter. Jig stops 76 can be used to control the length of each of the cuts made by the ganged cutters 74, in accordance with techniques well known in the cutting art. Each module can be formed by either cutting each module from the slab before or after the incisions are made by cutters 74 and 74A by measuring the length of each module from the end of the slab and cutting the measured portions of the slab in a direction perpendicular to the axes of holes 54.

By utilizing the method of the present invention, the modules 10 may take a number of different configurations depending upon the nature of the material or objects to be conveyed without appreciably affecting the costs of manufacturing the modules. Some examples of alternative configurations are shown in FIGS. 5–11 and each include a simple, high-strength structure for conveying regularly or irregularly shaped objects or materials that may be ramdomly arranged and may be washed, dried, heated, cooled, etc., with a liquid or a gas, while being carried on the conveyor.

Figure 8:
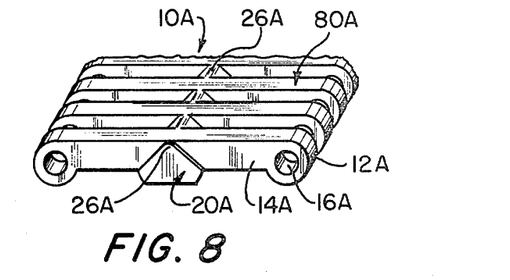
Figure 9:
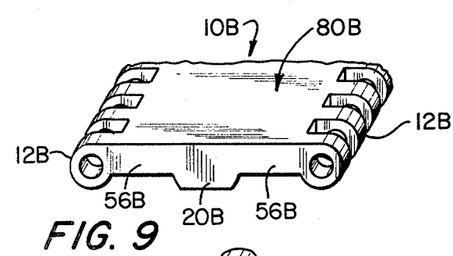

The end sections 12 and cross members 20 can be configured to provide for either a maximum or a minimum supporting surface area. For example, to provide for a supporting surface of increased area for carrying flat-bottomed objects such as cans or bottles, which are required to remain upright, the modules may be shaped, for example, as shown in FIGS. 8 and 9. In these embodiments the top surface of each of the modules 10A and 10B are formed as a substantially flat surface 80A and 80B, respectively. Each of the surfaces 80A and 80B are formed so as to lie in a plane tangential to the upper edges of end sections 12A and 12B, respectively. In the embodiment of FIG. 9, the incising operation is performed so that only the spacings between the link ends 12B are provided. Retaining the web or interconnecting portions 56B in its solid extruded form provides a substantially closed module when several modules are interconnected together. On the other hand, where an open grid-like structure is desired the incising operation is carried through the web portion to the cross member 20A so as to provide the links 14A between the cross-member 20A and link ends 12A. By providing the links 14A, the module when interconnected with other modules provides an opened grid-like structure for drainage between links 14A. The incising operation necessary to provide links 14A of module 10A can be carried through to provide the ridge 26A similar to the one shown in FIG. 1 wherein the apical edge 28 lies in the same plane as the surface 80A. Such a ridge provides added structural strength to the individual module 10A when loads are applied perpendicular to the surface 80A.

Figure 5:
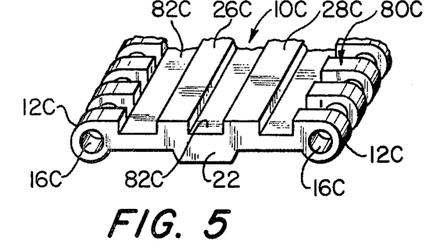
FIGS. 5-11 are each perspective fragmentary view of alternative forms of the module of the present invention.
Figure 10:
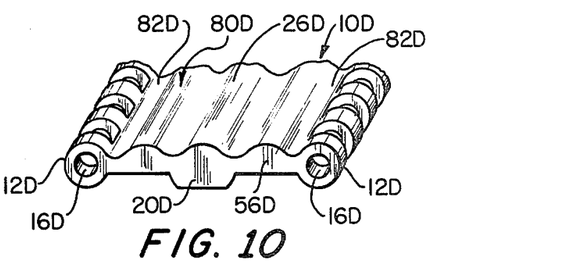

When a minimum contact area is desired, as when the lower surface of objects conveyed are to be treated with a liquid or gas, the upper surface of the module may be provided with one or more ridges and complimentary grooves as shown in FIGS. 1, 5, 6, 7 and 10. In the embodiment as shown in FIGS. 5 and 10, the spacings provided by the incising operation only extend through link ends 12 so that drainage occurs along the sides of each module. More specifically, the module 10C shown in FIG. 5 has its upper surface 80C formed with parallel elongated ridges 28C and grooves 82C, the grooves 82C being disposed between adjacent ridges as well as between each link end 12C and the adjacent ridge. Both ridges 28C and grooves 82C are formed with a substantially rectangular cross-section. In this way, ridges 28C can support substantially flat-bottomed objects with the bottom surfaces of the objects exposed by reason of the grooves 82C.

Similarly, the upper surface 80D of the module 10D, shown in FIG. 10, is provided with ridges 28D and grooves 82D each of which are formed in a curved manner to provide an undulated surface 80D. Objects can rest on ridges 28D while their bottom surfaces are exposed by reason of grooves 82D.

Figure 6:
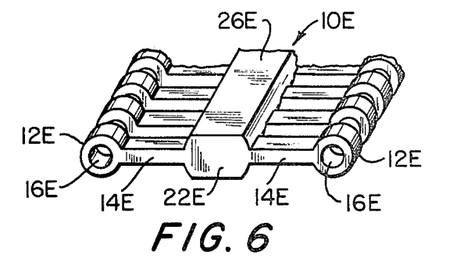
Figure 7:
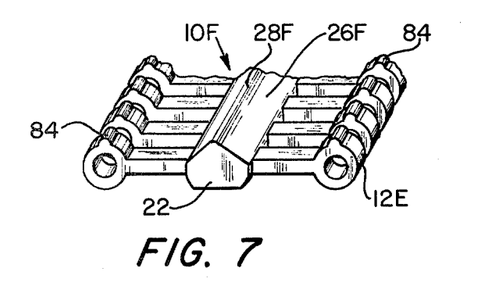

In both the embodiments shown in FIGS. 5 and 10 drainage occurs along the sides of the modules at the ends of grooves 82C and 82D.

Where minimum contact between the modules and the objects being conveyed, as well as maximum drainage are required the incising operation is performed so as to not only form the link ends 12, but also the links 14. Thus, in addition to the embodiment shown in FIG. 1, the module may take the form such as shown in FIGS. 6 and 7. Referring to FIG. 6 the ridge 28E is formed in an identical manner as the rib 22E on the opposite side of the module from the rib. In this manner the module is formed in a symmetrical pattern about a plane passing through the axes of the holes 16E so that each module is reversible. In this particular embodiment the top and bottom surfaces of the ridge 28E and rib 22E are substantially flat and lie in parallel planes which are both tangential to the outer edges of the link ends 12E. Thus, substantially flat objects will rest on the top surface of ridge 28E as well as the link ends 12E.

With respect to the embodiment shown in FIG. 7, each of the link ends 12E is provided with a nib or projection 84, the end of the latter lying in the same plane as the apical edge 28F of the ridge 26F. The provision of ribs 84 further minimizes the contact surface area of the objects being conveyed.

Figure 11:
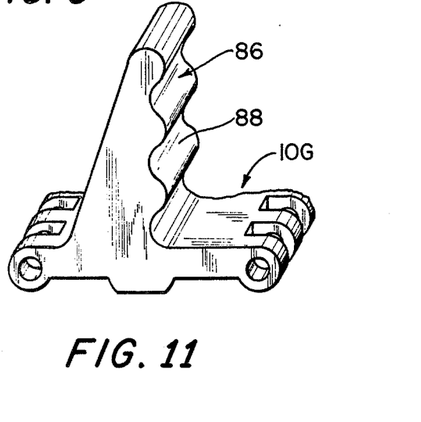

Finally, where it is desirable for the modules to be used to pick up objects and convey them along a horizontal plane as well as a vertical plane, the module may be formed with flights 86 such as shown in FIG. 11. For example, such a module may be used to pick up processed fruit and convey it along. When such a module is used the flight 86 will pick up and hold the fruit on one side 88 thereof when it carries it along. Accordingly, the surface 88 may be formed as an undulated surface so that the fruit will not stick.

Figure 12:
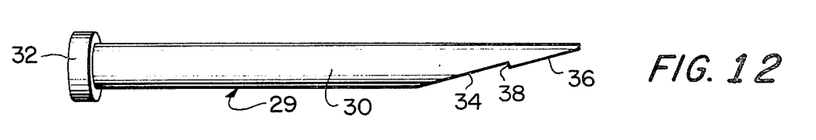
FIG. 12 is a side view of a preferred pivot pin in the present invention.

The preferred pivot pins or rods 29 used to pivotally connect two modules together are identical to those described in our previous applications. As shown in FIG. 12 the pivot pin 29 comprises a pin body or shaft 30 of generally cylindrical form having a button head 32 integrally formed therewith at one end. Head 32 has a larger cross-sectioned radius than shaft 30. The other end of the pin is formed with a pair of planar bevel surfaces 34 and 36 extending parallel to but displaced from one another so as to be not coplanar, at an acute or bevel angle (e.g. 30°) to the axis of shaft 30. Surfaces 34 and 36 are bound at an edge of each by ridge 38 which is preferably a flat surface disposed perpendicularly to the axis of shaft 30. Ridge 38 and surface 34 thereby form a groove extending across the axis of shaft 30 and facing back toward head 32. Preferably, pin 29 should be formed of a material such as a molten synthetic plastic which can be distorted under pressure.

Figure 13A:
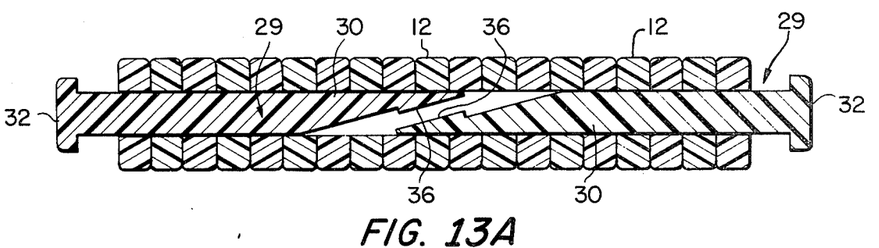
FIGS. 13A–C is a series of cross-sectional views showing installation of a pair of pivot pins of FIG. 12 used to hold the modules of the invention together.
Figure 13B:
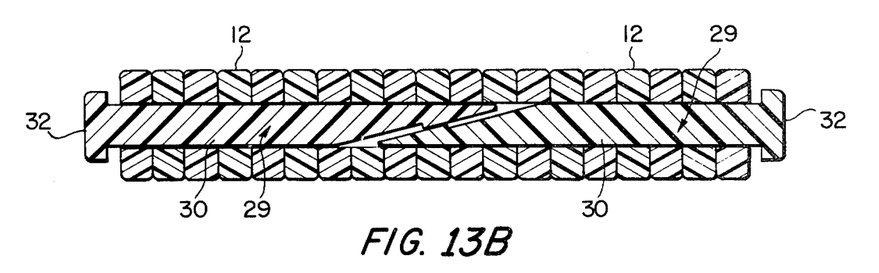
Figure 13C:
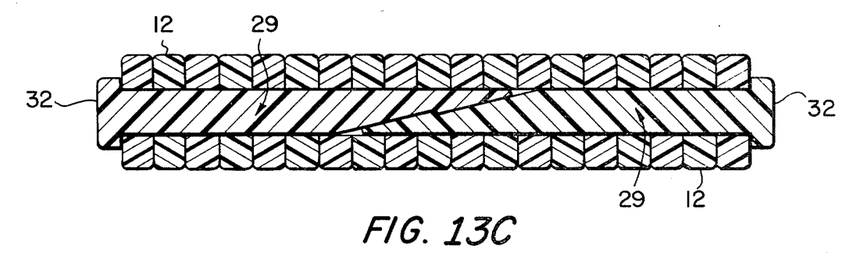

As shown in FIGS. 13A–13C inclusive, pins such as that of FIG. 2 are preferably used in pairs to pivotally connect modules of the invention together. Typically, a pair of pins 29 are inserted into the pivot hole at opposite ends of matched end sections 12 of the modules with the beveled surfaces 36 of each pin indexed so that they can contact one another as shown in FIG. 13A, face to face. By forcing the two pins toward one another axially, surface 36 slide one over the other as shown in FIG. 13B and the axial force tends to force the pins to expand slightly laterally thus forcing the "barrel", formed by end sections 12 also to expand slightly. Thus, ridges 38 override one another and mate or lock together as shown in FIG. 13C. Of course, once locking occurs, any lateral pressure on the "barrel" is relieved, and the latter tends to contract to hold the pins in positive engagement. Various modifications can be made to these pivot pins. For example, a single pin can be provided. In such a situation at least one of the heads 32 is omitted so that the single pin can be inserted in the pivot hole. Movement of such single pins along their individual axes with respect to the module can be eliminated by conventional means on the ends of the pins such as washer or C-rings (not shown) engaged in an annular groove in the rods; or a cap nut, washer, or similar device for engaging the rod so as to be axially fixed. Alternatively, a C-ring can be retained in place by a simple expedient of expanding the end of a rod by applying heat and pressure thereto. Also, one end of each rod can be preformed with a head similar to head 32, and the other end expanded after insertion, for example, simply by heating the polymeric material until it forms a bead or globular head.

Figure 14:
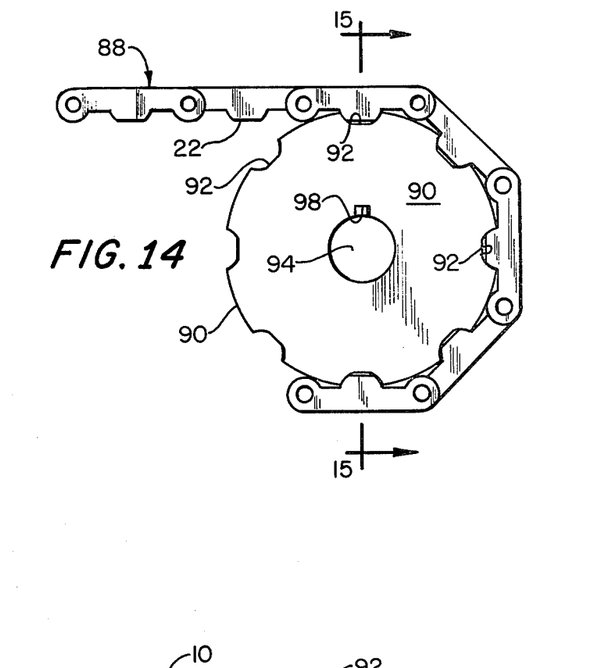
FIG. 14 is an elevational view, partially in section of a portion of a conveyor system incorporating the principles of the present invention.

Referring to FIG. 14, a multiplicity of modules 10 are assembled in an end-to-end and side-by-side relation by pivot pins 29 to form a conveyor. The modules are constructed so that the cross member 16 of each module can function to absorb lateral forces on the link-like elements (formed either by link-ends 12 or ends 12 and links 14) tending to separate the link-like elements, as well as bending forces on the modules tending to bend the pivot pins 29. Additionally, where the link ends 12 are formed with parallel planar surfaces 18, which are spaced so that the link ends 12 of another like module fit or meet snugly together, yet with a minimum of friction, the fit of the end sections contributes significantly to the ability of the pivotally-connected modules to resist deformation due to bending forces across the axis of the pivot pin. Thus, each pivot pin is subjected primarily to a large number of small shear forces so that the strength requirement for the pivot pins are small as compared with a conveyor composed of individual chain link modules. The use of circumscribed holes 16, i.e., holes completely surrounded by the material of the end section, of course permit the pins to positively lock respective modules together while permitting independent rotation of end-to-end connected modules about the pins. Since each module is extruded a conveyor of any desired width can be formed by employing modules of the desired width during the extruding process prior to the cutting operation. Where each link of a conveyor includes more than one module, to add strength to the conveyor, the modules of each link or row are staggered with respect to the modules of adjacent rows, as described and shown in FIG. 4 of our previous applications. The joints of adjacent modules in each row thereby fall at an intermediate position, typically midway between the sides of adjacent modules in the next row so that in effect the cross-members overlap to resist bending stresses which might otherwise be transmitted to the pivot pins. A conveyor of any desired width thus can be formed by employing modules each of uniform width or modules having various size widths.

Figure 15:
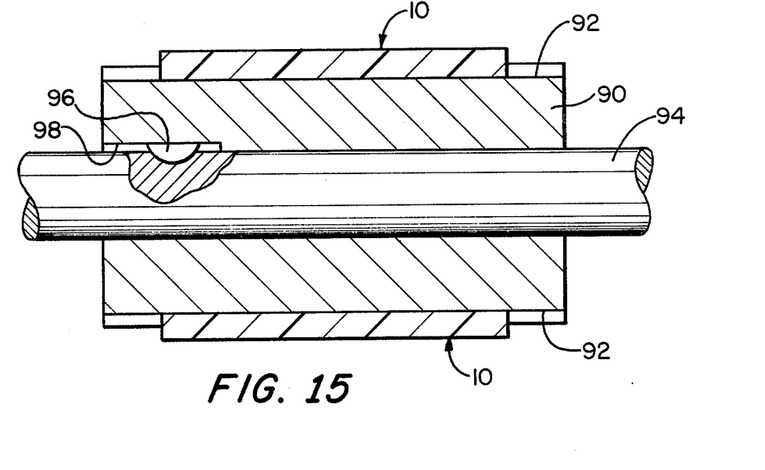
FIG. 15 is an elevational view taken along line 15—15 of FIG. 14.

When the modules are assembled as shown in FIG. 14 to form a conveyor belt 88, the ribs 22 of the modules are all disposed on the inside of the belt so that the belt can be driven by suitable drive means such as drive wheel 90 shown in both FIGS. 14 and 15. Drive wheel 90 is provided with sprocket grooves 92 intended to receive and mate with ribs 22. Sprocket grooves 92 are radially offset from one another by the radial distance between two ribs of two adjacent modules as the modules rotate around the drive wheel. Each groove 92 is provided with a substantially flat bottom and cylindrically curves sides so as to receive and mate with each rib 22 of each module. It is noted that ribs 22 and grooves 92 are made sufficiently deep so that the belt will not slip on the drive wheel as the latter rotates about the axis. It will be appreciated that since the drive wheel engages the rib of each module, stress is placed on center portion 20, the latter being provided with a relatively strong rigid cross section. The wheel as shown in FIG. 5 is preferably wide enough so as to accommodate the entire width of each link or row of the modular belt. The drive wheel is suitably mounted for example, by providing a Woodruf key 96 in the key way 98 so as to secure the wheel to shaft 94 so that the wheel can be rotatably driven by a drive motor (not shown) or similar means for rotating the shaft.

The invention thus described has several advantages. The method of the present invention provides a continuous processing technique for manufacturing modules of any desired number of link ends with the same equipment and from the same die. Where a module of larger cross-sectional shape or a different shape is desired one merely needs to use a different die having the desired cross-sectional size and shape to manufacture each module. Thus, various sized and shaped modules can be manufactured without considerably increasing the production costs. This is of a particular advantage for small quantity production.

A typical use of a conveyor providing a severe test of its design is in the process of food products involving a corrosive liquid such as salt water. Heretofore conveyors for such purposes have been formed of stainless steel to resist corrosion and permit cleaning including, for example, the use of detergents and steam. Understandably, such conveyors are difficult and expensive to fabricate and assemble; are heavy, thus necessitating substantial and expensive supporting and driving sprockets and requiring large amounts of power to operate; wear out rapidly because of the difficulty in providing for lubrication; tend to break when bent or stressed; and are difficult to repair. The conveyor module of the present invention is intended to be formed of a relatively light weight, organic polymeric plastic material such as polyethylene, polypropylene, polycarbonate, or the like, which is compatable with corrosive liquids and atmospheres and can be formed by conventional extrusion processes. Thus each module represents a substantial saving both in material and manufacturing costs over metallic materials such as stainless steel.

A further advantage in using an organic polymeric plastic material is that the polymer can be impregnated with an antibotic to provide a self-sanitizing antibacterial plastic such as available from Medical Plastics Corporation of America, Greensboro, North Carolina, under the trademark "MEDI-GUARD". It is believed that, for example, an antibotic such as tetracycline incorporated into polypropylene will bleed slowly from the polymeric material when the latter is moistened, thereby tending to reduce bacterial growth on the polymer. In order to keep the pivot joints reasonably sterile, it is believed that it is sufficient that only the pivot rod be made of the antibotic impregnated polymer.

By manufacturing each of the modules with ribs 22 a unique conveyor belt and conveyor system can be provided whereby the ribs 22 of the modules mate with grooves 92 of the drive mechanism of the conveyor system.

As previously noted, another advantage of the modular conveyor construction of the invention is that the stress on the pivot pins are so small and of a nature which permits the pins to be formed of synthetic polymeric materials so that the conveyor may be essentially all plastic with a minimum, if any, metallic components. With pivot pins, of appropriately selected polymers, substantially no lubrication is required and wear is minimal. Replacement of modules is a simple matter and assembly of the modular belt is economically possible as would not be the case with individual conveyor links.

It will be seen from the foregoing that in addition to those already enumerated, the advantages of this present invention include:

a. High tensile strength conveyor resulting from the pivot pins or rods being in multiple shear.

b. Wide conveyors are possible because of the strength of the cross members, offsetting of modules and intermeshing of modular links.

c. Resistance to breaking resulting from the flexibility of polymeric materials.

d. Polymeric materials will not scratch or marr many articles that might be damaged by metal conveyors.

e. The close-fitting joints of the end sections of the links are self-cleansing.

f. The conveyor belt can be driven by a simple drive mechanism engaging ribs 22 which places greater stress on center portion 20 and less on link ends 12 and pivot pins 29 when the belt is driven by wheel 90.

g. Polymeric plastics such as polypropylene are resistant to the build up of film and deposits.

Since certain changes may be made in the above method, product and apparatus without departing from the scope of the invention herein involved, it is intended that all matter contained in the above description and shown in the accompanying drawings shall be interpreted as illustrative and not in a limiting sense.

What is claimed is:

1. A method of forming a link module for constructing linked conveyor structures comprising:
   extruding a synthetic polymeric material through a die to form a continuous slab having first and second opposite edges formed as respective cylinders, the cylindrical axes of which are substantially parallel to one another, and a relatively high strength, rigid intermediate section integrally formed with and joining said opposite edges so as to preserve the parallel relationship of said axes and so as to resist bending stresses applied to said slab, said die having the shape of the cross-section of said slab taken perpendicular to the axes of said cylindrical apertures;
   forming in each of said cylinders a coaxial cylindrical aperture circumscribed by said each cylinder;
   removing portions of said slab including portions of said first and second opposite edges so as to form, respectively, first and second pluralities of spaced-apart link ends each circumscribing one of said cylindrical aperture, said link ends being dimensioned and spaced apart so that said module is end-to-end reversible and engageable with another one of said modules so that a cylindrical aperture of said module is coaxial with a cylindrical aperture in said another one of said modules.

2. The method in accordance with claim 1 wherein removing portions of said slab includes cutting said opposite ends of said slab with a plurality of spaced-apart ganged cutters.

3. The method in accordance with claim 1 wherein said step of removing portions of said slab further includes removing portions of said intermediate section.

4. The method in accordance with claim 1 wherein said coaxial aperture in each of said cylinders is formed subsequent to the formation of each said cylinder.

5. The method in accordance with claim 1 wherein said coaxial aperture in each of said cylinders is formed concurrently with the formation of each said cylinder.

6. A method of forming a linked belt comprising a plurality of like modules comprising the steps of:
   forming a die having a cross-section defining first and second opposite edges each formed as respective cylinders, the cylindrical axes of which are substantially parallel to one another, and a relatively high strength, rigid intermediate section integrally formed with and joining said opposite edges so as to preserve the parallel relationship of said axes and resist bending stresses;
   extruding a quantity of synthetic polymeric material through said die to form an elongated slab having substantially the same cross-section as said die;
   forming in each of said cylinders a coaxial cylindrical aperture circumscribed by said each cylinder;
   removing portions of said slab including portions of said first and second opposite edges so as to form, respectively, first and second pluralities of spaced-apart link ends each circumscribing one of said cylindrical apertures,
   separating sequential portions of said slab from one another to form individual modules each having link ends of said first and second pluralities, said link ends being so dimensioned and spaced apart that each said module is end-to-end reversible and engagable with another one of said modules to bring a cylindrical aperture of said module into coaxial relation with a cylindrical aperture in said another one of said modules,
   releasably engaging said link ends of each of said modules so that said cylindrical aperture through said link ends of said first plurality of one module is coaxially aligned with said cylindrical aperture through said link ends of said second plurality of another module, and;
   pivotally connecting each of said modules at said engaged ends.

7. A method as defined in claim 6 further including the step of arranging said modules so that a side of each of said modules is disposed substantially centrally between sides of an adjacent module.

8. A method as defined in claim 6 wherein pivotally connecting each of said modules inserting a pivot rod into said coaxially aligned pivotal holes of said first and second link ends.

9. A method as defined in claim 8 wherein inserting said pivot rod includes connecting a pair of pivot pins, each including a substantially cylindrical shaft having an enlarged head portion at one end and being tapered at the other end, said tapered end being formed of a pair of bevel surfaces substantially parallel to but displaced from one another to form therebetween a ridge bounding a groove laterally disposed across the axis of said shaft and facing substantially toward said head portion.

10. A method as defined in claim 6, wherein connecting a pair of pivot pins includes inserting each of said pair of pivot pins in opposite sides of said coaxially aligned pivotal holes so that said beveled surfaces of said pins are indexed and in contact with one another in a face-to-face relationship, and forcing said two pins toward one another axially so that said ridges override one another and lock together.

11. In an integrally-formed plastic module for constructing linked structures for use in a conveyor system, said module, comprising in combination: a first plurality of link ends of substantially identical width, each link end being formed to circumscribe a pivotal hole, said holes of said first plurality being arranged coaxially; a second like plurality of link ends of substantially identical width, each link end of said second plurality being formed to circumscribe a pivotal hole, said holes of said second plurality being arranged coaxially, the axes of respective holes of both pluralities of link ends being substantially parallel; and an intermediate portion having opposing sides and being integrally formed with and joining said first and second pluralities of link ends so as to preserve the parallel relationship of said axes and so as to resist bending stresses applied to said module, said link ends of each of said plurality being dimensioned and spaced apart by a distance slightly greater than the width of each link end so that said module is end-to-end reversible and so that a plurality of said modules may be engaged with each other at said ends, the improvement comprising:

said module being extruded through a die member having a cross-sectional shape identical to the cross-section shape of said module taken through a plane perpendicular to the axes of said pivotal holes and cut to form said link ends; and said module including a rib disposed on at least one of said sides of said intermediate portion for engaging drive means of said conveyor system, said rib including a flat surface and cylindrical side surfaces disposed along opposite edges of said flat surface, said cylindrical side surfaces having the same axis of revolution, said axis of revolution extending substantially parallel to said axes of said pivotal holes.

12. A module in accordance with claim 11, the improvement further comprising said intermediate portion having a center section and web sections connecting said center section with said link ends.

13. A module in accordance with claim 12, wherein each of said web sections is substantially solid across the width of said module.

14. A module in accordance with claim 12, wherein each of said web sections includes a plurality of links each of said links connecting a corresponding one of said link ends to said center section.

15. A module in accordance with claim 14, wherein the width of each of said links is equal to and spatially coplanar with the link end to which it is connected.

16. A module in accordance with claim 11 wherein the opposite side of said intermediate portion is provided with a flight, the width of said flight extending the entire width of said module.

17. A module in accordance with claim 11, wherein the opposite side of said intermediate portion is substantially flat.

18. A module in accordance with claim 14, wherein said opposite side lies in a plane substantially tangential to the outer peripheral edges of said first and second pluralities of said link ends.

19. A module in accordance with claim 11, wherein said intermediate portion includes at least one raised elongated ridge on the opposite side of said intermediate portion from said rib extending the width of said module, said ridge having an axis of elongation extending parallel to said axes of said pivotal holes.

20. A module in accordance with claim 19, wherein said ridge is formed identical to and is disposed opposite from said rib.

21. A module in accordance with claim 19, wherein said ridge is of a substantially triangular cross-section.

22. A module in accordance with claim 21, wherein said ridge has an apical edge disposed in a plane tangential with the outer peripheral edges of said first and second pluralities of said link ends.

23. A module in accordance with claim 21, wherein each of said link ends includes a nib extending therefrom, and said ridge has an apical edge wherein said apical edge and the ends of said nibs are disposed in a common plane.

24. A module in accordance with claim 19, wherein said intermediate portion includes a plurality of said ridges spaced apart from one another so as to form grooves therebetween.

25. A module in accordance with claim 24, wherein said ridges each have a rectangular cross-section.

26. A module in accordance with claim 24, wherein said ridges and grooves form an undulated surface.

27. A linked belt for use in a conveyor system comprising in combination:

a plurality of like extruded plastic modules, each of said modules including a first plurality of link ends of like width, a second plurality of link ends each of said like width, and an intermediate portion having opposing sides and integrally formed with and joining said first and second pluralities of link ends, said intermediate portion including a rib formed on one of said sides for engaging drive means of a conveyor system, said rib including a substantially flat surface and cylindrical side surfaces disposed along opposite edges of said flat surface;

said link ends of each of said modules being releasably engaged between and substantially in contact with the link ends of an adjacent module except for individual link ends disposed at the extreme sides of said belt; and means for pivotally connecting said modules at engaged link ends so that each said rib of each module extends across said belt.

28. A belt as defined in claim 27, wherein each of said link ends of each plurality thereof are spaced from one another by a similar distance.

* * * * *

UNITED STATES PATENT AND TRADEMARK OFFICE
CERTIFICATE OF CORRECTION

PATENT NO. : 4,213,527
DATED : July 22, 1980
INVENTOR(S) : James M. Lapeyre and Fernand S. Lapeyre It is certified that error appears in the above-identified patent and that said Letters Patent are hereby corrected as shown below:

Column 10, line 38, after "modules" insert --includes--.

Signed and Sealed this

Ninth Day of December 1980

[SEAL]

*Attest:*

SIDNEY A. DIAMOND

*Attesting Officer*  *Commissioner of Patents and Trademarks*